United States Patent
Chu et al.

(10) Patent No.: US 11,094,479 B1
(45) Date of Patent: Aug. 17, 2021

(54) KEY STRUCTURE

(71) Applicant: Primax Electronics Ltd., Taipei (TW)

(72) Inventors: Xiao-Jun Chu, Taipei (TW); Li-Qiang Chen, Taipei (TW); Liu-Bing Cai, Taipei (TW); Sheng-An Tsai, Taipei (TW); Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/885,481

(22) Filed: May 28, 2020

(30) Foreign Application Priority Data

Mar. 27, 2020 (CN) .......................... 202010227152.0

(51) Int. Cl.
*H01H 13/705* (2006.01)
*H01H 3/12* (2006.01)
*G06F 3/02* (2006.01)

(52) U.S. Cl.
CPC ......... *H01H 13/705* (2013.01); *G06F 3/0202* (2013.01); *H01H 3/122* (2013.01); *H01H 2215/006* (2013.01); *H01H 2221/044* (2013.01); *H01H 2231/002* (2013.01)

(58) Field of Classification Search
CPC ................. H01H 13/705; H01H 3/122; H01H 2215/006; H01H 2221/044; G06F 3/0202
See application file for complete search history.

(56) References Cited

U.S. PATENT DOCUMENTS

| | | | | |
|---|---|---|---|---|
| 6,171,003 B1* | 1/2001 | Lo | .......................... | H01H 13/705 400/490 |
| 7,687,732 B1* | 3/2010 | Tabata | .................. | H01H 13/705 200/345 |
| 8,058,579 B2* | 11/2011 | Chien | .................. | H01H 13/705 200/345 |
| 8,927,884 B2* | 1/2015 | Shih | ........................ | H01H 13/86 200/5 A |
| 9,941,068 B2* | 4/2018 | Liu | .......................... | H01H 13/84 |
| 10,636,593 B2* | 4/2020 | Chang | .................... | H01H 13/84 |
| 2003/0150703 A1* | 8/2003 | Tsau | ........................ | H01H 13/705 200/345 |
| 2017/0069445 A1* | 3/2017 | Wang | .................... | H01H 13/704 |
| 2017/0169967 A1* | 6/2017 | Chen | ...................... | H03K 17/968 |

* cited by examiner

*Primary Examiner* — Kyung S Lee
(74) *Attorney, Agent, or Firm* — Kirton McConkie; Evan R. Witt

(57) ABSTRACT

A key structure includes a keycap, a pedestal and an elastic element. The keycap includes a main body and a coupling shaft. The pedestal includes a key slot. The key slot has an upper part and a lower part. The coupling shaft is penetrated through the upper part of the key slot and movable within the key slot upwardly or downwardly. The elastic element is installed in the lower part of the key slot. After an external force applied to the keycap is released, the elastic element is elastically restored, so that the keycap is returned to an original position. At the same time, the buffering elements in the key slot interfere with the coupling shaft. Consequently, an ascending speed of the keycap is reduced, and a click sound generated from the collision between keycap and the pedestal is reduced.

14 Claims, 10 Drawing Sheets

KEY STRUCTURE

FIELD OF THE INVENTION

The present invention relates to the structure of an input device, and more particularly to a key structure.

BACKGROUND OF THE INVENTION

In modern societies, electronic products become indispensable parts in human lives. The electronic products are applied in many sectors, including food, clothing, housing, transportation, education and entertainment. Generally, the electronic product is equipped with a keyboard. When the keyboard is clicked, a click sound is usually generated. Some users like the click sound of the keyboard because the click sound provides good tactile feel. However, the click sound of the keyboard is uncomfortable to some users because the click sound in the silent environment is noisy to them.

For solving the above drawbacks, there is a need of providing a simplified and easily-assembled key structure so as to reduce the clicking sound.

SUMMARY OF THE INVENTION

The present invention provides a simplified and easily-assembled key structure with a noise reducing function.

In accordance with an aspect of the present invention, a key structure is provided. The key structure includes a keycap, a pedestal and an elastic element. The keycap includes a main body and a coupling shaft. The coupling shaft is disposed on a bottom surface of the main body. The coupling shaft includes at least two opposite coupling ribs and two opposite openings. The pedestal includes a key slot, at least two stopping parts and at least two buffering elements. The key slot has an upper part and a lower part. The coupling shaft is penetrated through the upper part of the key slot and movable within the key slot upwardly or downwardly. The at least two stopping parts are located at the upper part of the key slot and aligned with the at least two coupling ribs. The at least two buffering elements are located at an inner surface of the key slot, contacted with a surface of the coupling shaft and aligned with the at least two openings. The elastic element is installed in the lower part of the key slot. The elastic element is contacted with the coupling shaft, so that the at least two coupling ribs are contacted with the at least two stopping parts. When an external force is applied to the main body of the keycap, the at least two buffering elements are inserted into the at least two openings. When the external force is released, the elastic element is elastically restored, so that the keycap is ascended and returned to an original position. While the keycap is ascended and returned to the original position, the at least two buffering elements are detached from the at least two openings and the at least two buffering elements interfere with the coupling shaft, so that an ascending speed of the keycap is reduced and a click sound generated from collision between the at least two coupling ribs and the at least two stopping parts is reduced.

In an embodiment, the at least one two stopping parts are located at two opposite corners of the upper part of the key slot.

In an embodiment, the at least one two stopping parts are located at two opposite sides of the upper part of the key slot.

In an embodiment, the at least two buffering elements are located at two opposite corners of the inner surface of the key slot.

In an embodiment, the at least two buffering elements are located at two opposite sides of the inner surface of the key slot.

In an embodiment, each of the at least two buffering element includes a connecting part and an elastic hook. A first end of the connecting part is connected with the inner surface of the key slot. A second end of the connecting part is connected with the elastic hook. A swingable gap is formed between the elastic hook and the inner surface of the key slot.

In an embodiment, a first end of the coupling shaft is connected with the main body of the keycap, and a second end of the coupling shaft is away from the main body of the keycap. The at least two coupling ribs are located at the second end of the coupling shaft. The at least two openings are located at the first end of the coupling shaft While the keycap is descended, the elastic hook is swung and inserted into the corresponding opening. Consequently, the elastic hook does not interfere with the coupling shaft.

While the keycap is ascended, the elastic hook is pushed by the surface of the coupling shaft. Consequently, the elastic hook is swung and detached from the corresponding opening and the elastic hook and the coupling shaft interfere with each other.

In an embodiment, the elastic hook has a slant surface.

In an embodiment, the coupling shaft includes a push part for pushing the elastic element. The push part is located at a middle region of a bottom side of the coupling shaft.

In an embodiment, the pedestal further includes an inner ring-shaped wall structure and an outer ring-shaped wall structure. The inner ring-shaped wall structure is arranged around the key slot. The outer ring-shaped wall structure is arranged around the inner ring-shaped wall structure. The outer ring-shaped wall structure and the inner ring-shaped wall structure are connected with each other at the lower part of the key slot.

In an embodiment, an accommodation space is formed between the inner ring-shaped wall structure and the outer ring-shaped wall structure, and a skirt structure of the main body of the keycap is accommodated within the accommodation space.

In an embodiment, the key structure further includes a linking bar, and the linking bar is pivotally coupled to a lower portion of the accommodation space to support the main body of the keycap.

The key structure of the present invention has the following benefits. The buffering elements installed in the key slot can reduce the ascending speed of the keycap. Since the click sound caused from the collision between the coupling ribs and the stopping parts are reduced, the noise reducing function is achieved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
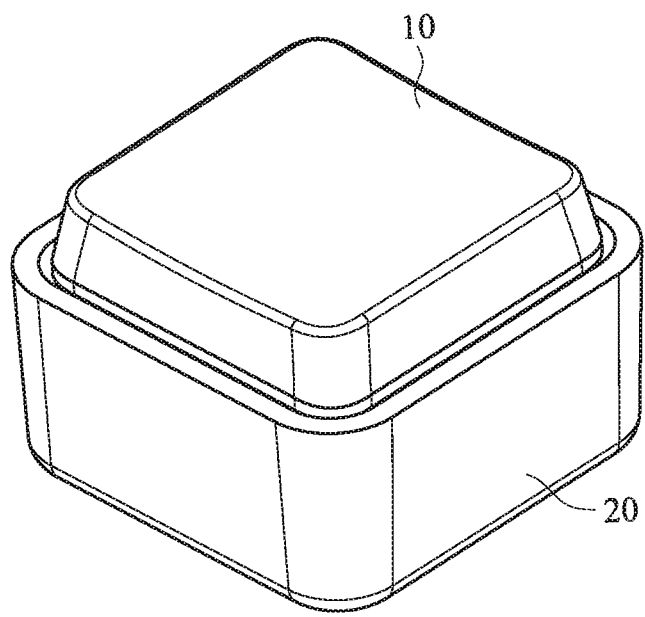
FIG. 1A is a schematic perspective view illustrating a key structure according to a first embodiment of the present invention.
Figure 1B:
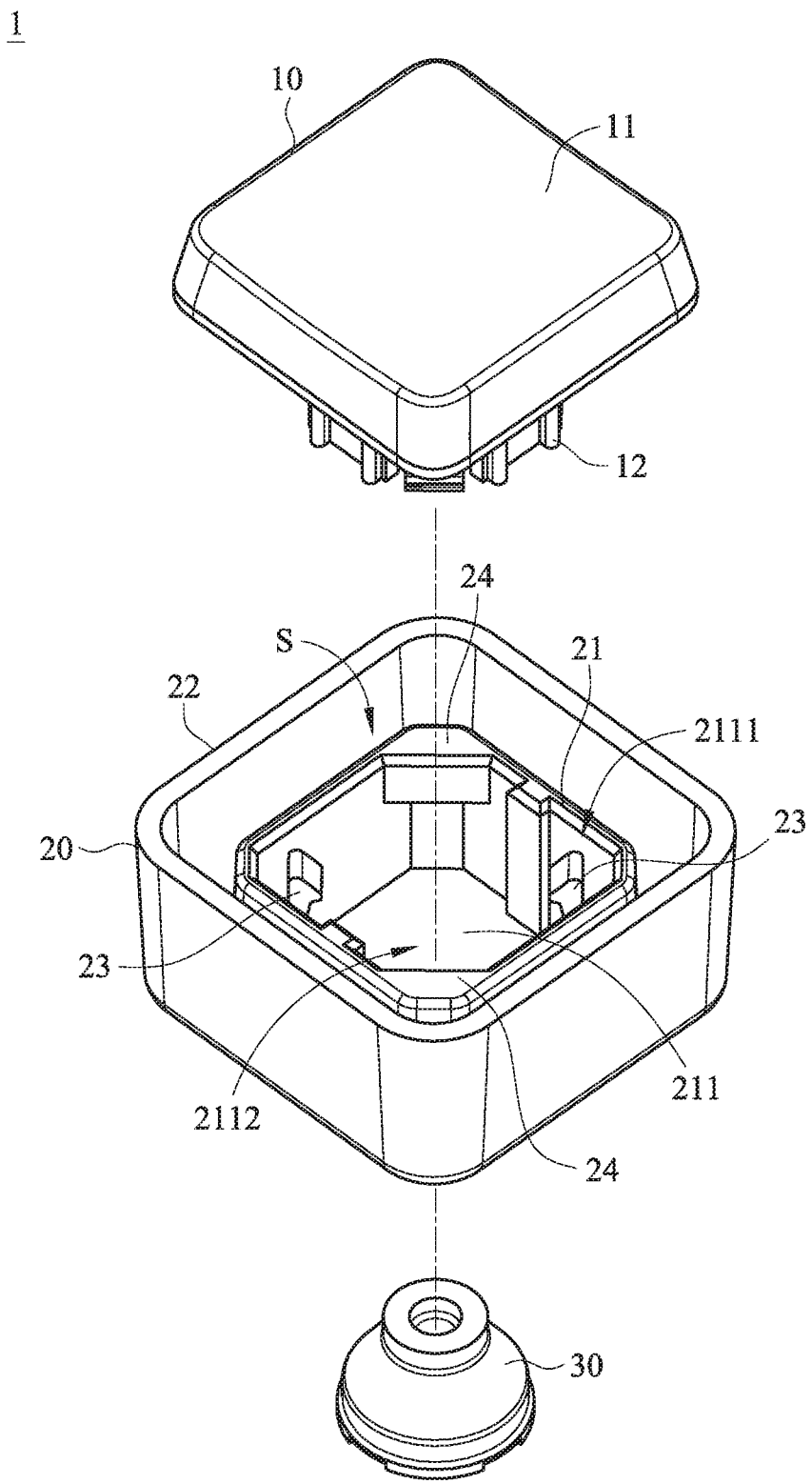
FIG. 1B is a schematic exploded view illustrating the key structure according to the first embodiment of the present invention and taken along a viewpoint.
Figure 1C:
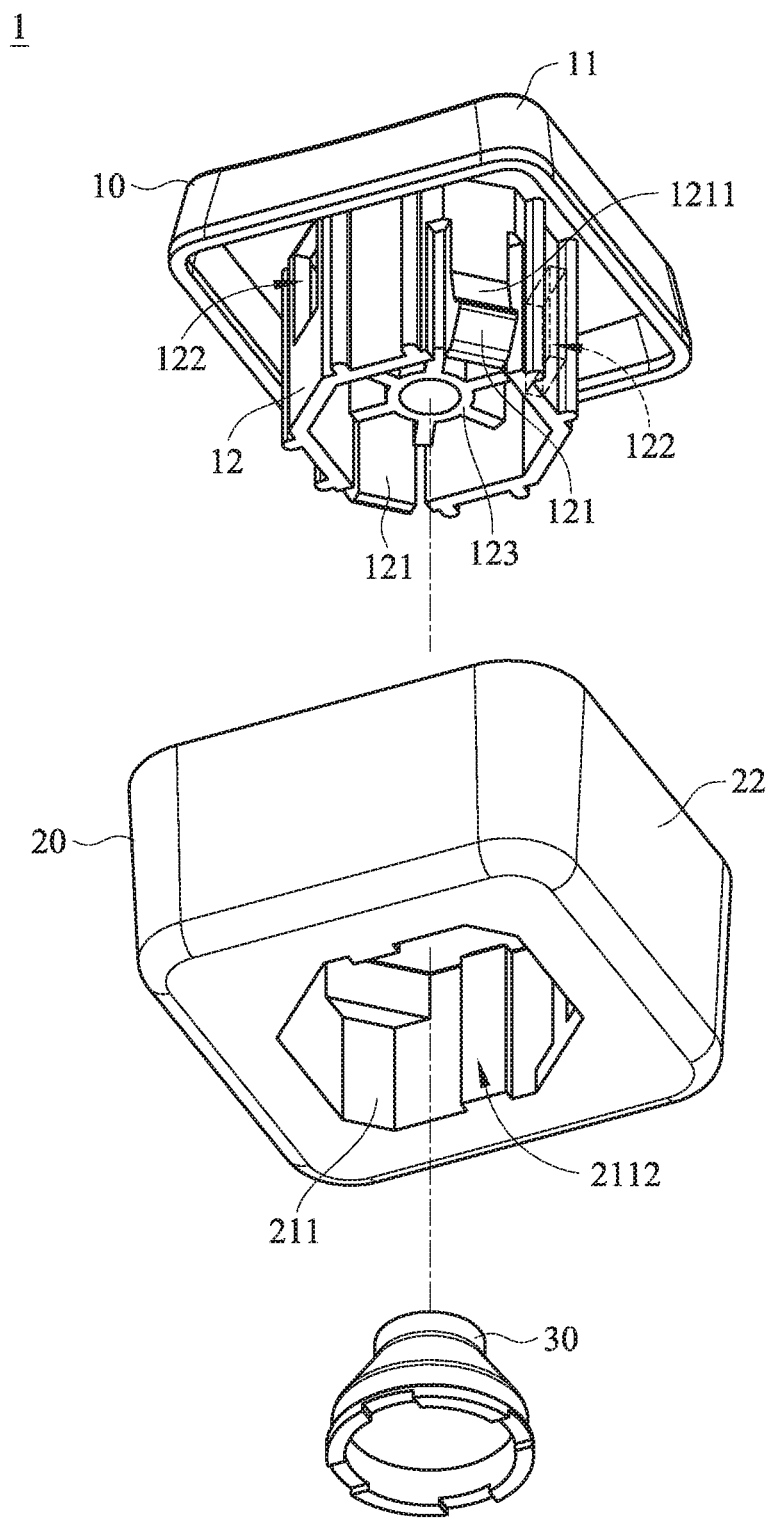
FIG. 1C is a schematic exploded view illustrating the key structure according to the first embodiment of the present invention and taken along another viewpoint.

Please refer to FIGS. 1A, 1B and 1C. FIG. 1A is a schematic perspective view illustrating a key structure according to a first embodiment of the present invention. FIG. 1B is a schematic exploded view illustrating the key structure according to the first embodiment of the present invention and taken along a viewpoint. FIG. 1C is a schematic exploded view illustrating the key structure according to the first embodiment of the present invention and taken along another viewpoint.

The key structure 1 comprises a keycap 10, a pedestal 20 and an elastic element 30.

The keycap 10 comprises a main body 11 and a coupling shaft 12. The coupling shaft 12 is disposed on a bottom surface of the main body 11. The coupling shaft 12 comprises two opposite coupling ribs 121, two opposite openings 122 and a push part 123. The coupling ribs 121 are arranged along a radial direction. The openings 122 are arranged along another radial direction. A first end of the coupling shaft 12 is connected with the main body 11. A second end of the coupling shaft 12 is away from the main body 11. The two coupling ribs 121 are located at the second end of the coupling shaft 12. Each coupling rib 121 has a slant surface 1211. The two openings 122 are located near the first end of the main body 11. Consequently, there is a height difference between the coupling rib 121 and the corresponding opening 122 along the vertical direction. The push part 123 is located at a middle region of a bottom side of the coupling shaft 12.

The pedestal 20 comprises an inner ring-shaped wall structure 21, an outer ring-shaped wall structure 22, two buffering elements 23 and two stopping parts 24. The pedestal 20 has a key slot 211. The key slot 211 is formed in the inner ring-shaped wall structure 21. The key slot 211 has an upper part 2111 and a lower part 2112. The coupling shaft 12 can be penetrated through the upper part 2111 of the key slot 211. Moreover, the coupling shaft 12 is movable within the key slot 211 upwardly or downwardly. The two buffering elements 23 are formed in an inner surface of the key slot 211. The two buffering elements 23 are aligned with the corresponding openings 122 of the coupling shaft 12. The two stopping parts 24 are located at the upper part 2111 of the key slot 211. Moreover, the two stopping parts 24 are aligned with the corresponding coupling ribs 121 of the coupling shaft 12. In this embodiment, the two stopping parts 24 are located at two opposite corners of the upper part 2111 of the key slot 211. The two buffering elements 23 are located at two opposite corners of the inner surface of the key slot 211. That is, the two stopping parts 24 and the buffering elements 23 are alternately located at the key slot 211.

Please refer to FIGS. 1B and 1C. The outer ring-shaped wall structure 22 is arranged around the inner ring-shaped wall structure 21. Moreover, the outer ring-shaped wall structure 22 and the inner ring-shaped wall structure 21 are connected with each other at the lower part 2112 of the key slot 211. In this embodiment, an accommodation space S is formed between the inner ring-shaped wall structure 21 and the outer ring-shaped wall structure 22. The skirt structure of the main body 11 of the keycap 10 is accommodated within the accommodation space S. Consequence, when the keycap 10 is moved downwardly, the skirt structure of the main body 11 does not interfere with the inner ring-shaped wall structure 21 and the outer ring-shaped wall structure 22.

The elastic element 30 is installed in the lower part 2112 of the key slot 211 and contacted with the push part 123 of the coupling shaft 12. The elastic element 30 may provide an elastic restoring force to the keycap 10. In this embodiment, the elastic element 30 has a dome shape, and the elastic element 30 is made of elastic silicone rubber.

Figure 2A:
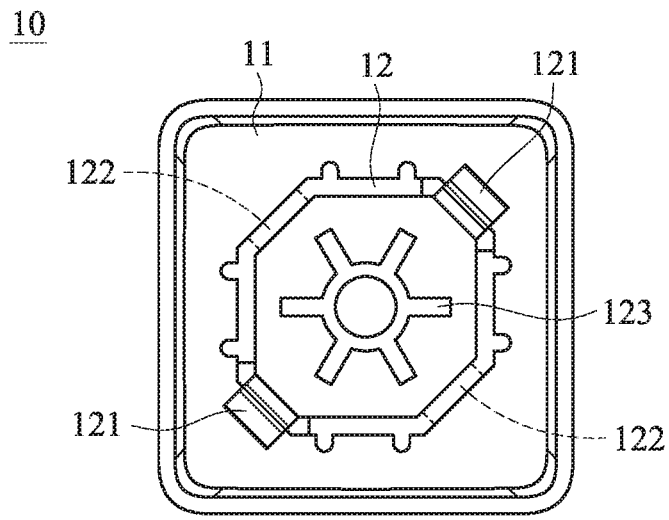
FIG. 2A is a schematic bottom view illustrating the keycap of the key structure according to the first embodiment of the present invention.
Figure 2B:
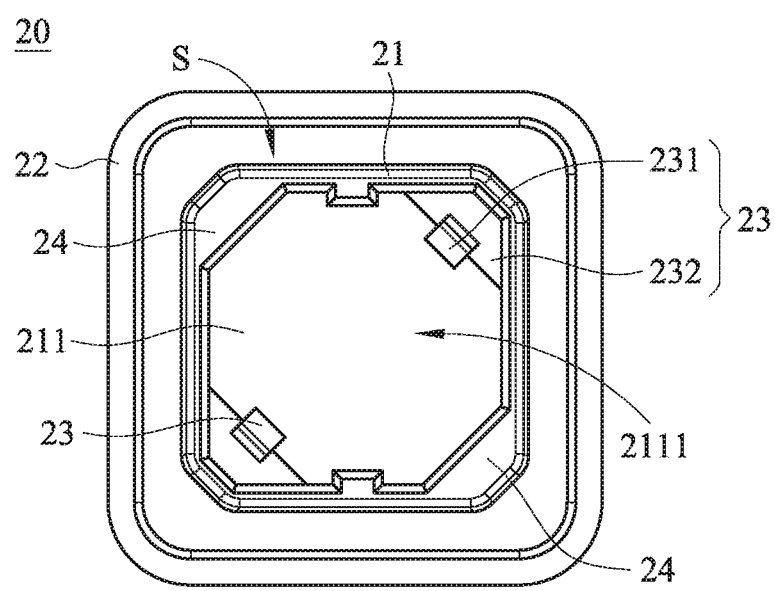
FIG. 2B is a schematic top view illustrating the pedestal of the key structure according to the first embodiment of the present invention.

Please refer to FIGS. 2A and 2B. FIG. 2A is a schematic bottom view illustrating the keycap of the key structure according to the first embodiment of the present invention. FIG. 2B is a schematic top view illustrating the pedestal of the key structure according to the first embodiment of the present invention.

As shown in FIG. 2A, the two coupling ribs 121 are located at two opposite sides of the coupling shaft 12, respectively. The two openings 122 are located at two other opposite sides of the coupling shaft 12, respectively. The push part 123 is located at the middle region of the bottom side of the coupling shaft 12.

Please refer to FIG. 2B. The two stopping parts 24 are located at two opposite corners of the upper part 2111 of the key slot 211, respectively. The two buffering elements 23 are located at other two opposite corners of the inner surface of the key slot 211, respectively. That is, the two stopping parts 24 and the buffering elements 23 are alternately located at the key slot 211. In an embodiment, the buffering element 23 comprises an elastic hook 231 and a connecting part 232. The elastic hook 231 and the connecting part 232 are integrally formed with the inner ring-shaped wall structure 21. A first end of the connecting part 232 is connected with the inner surface of the key slot 211. A second end of the connecting part 232 is connected with the elastic hook 231. Consequently, a swingable gap is formed between the elastic hook 231 and the inner surface of the key slot 211. Due to the swingable gap, the elastic hook 231 can be elastically swung in the region between the inner surface of the key slot 211 and the coupling shaft 12.

Figure 3:
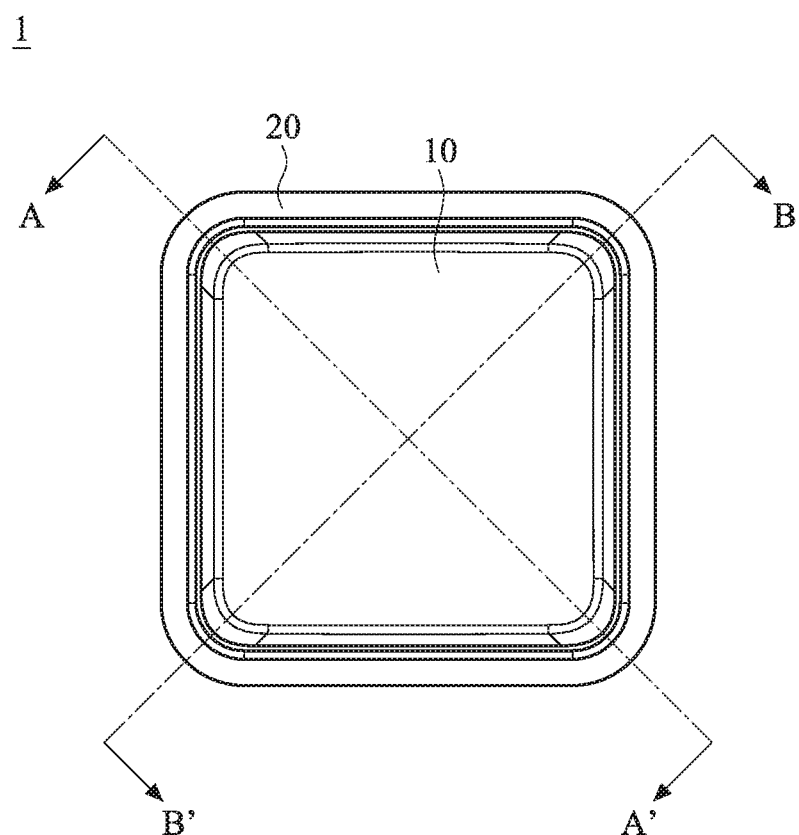
FIG. 3 is a schematic top view illustrating the key structure according to the first embodiment of the present invention.
Figure 4A:
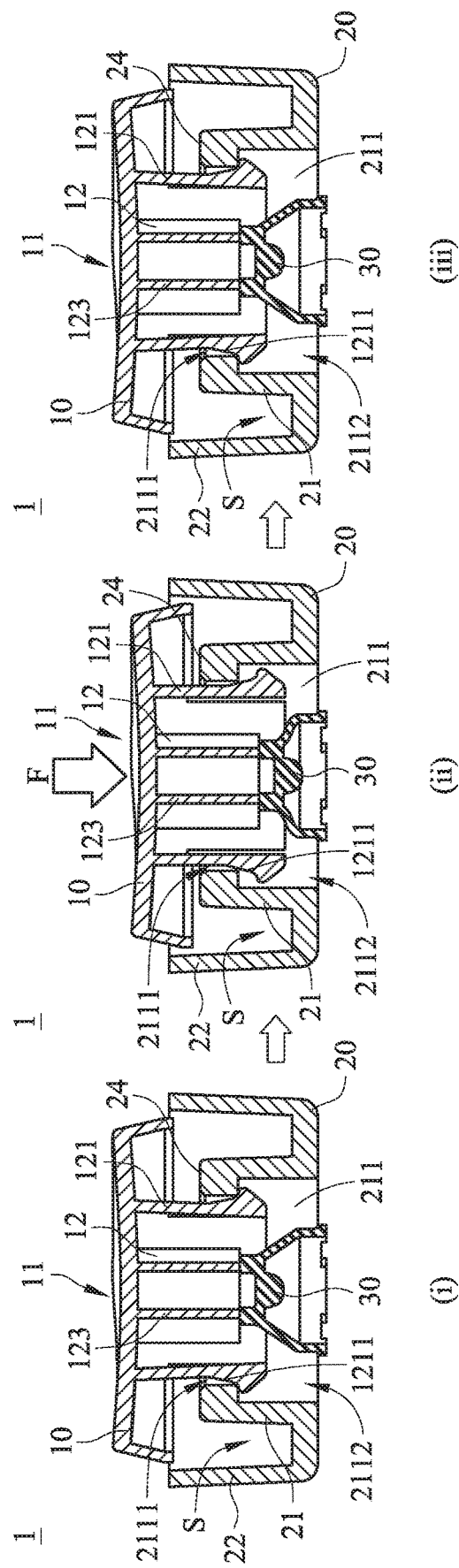
FIG. 4A schematically illustrates the actions of the key structure as shown in FIG. 3 and taken along the line A-A'.
Figure 4B:
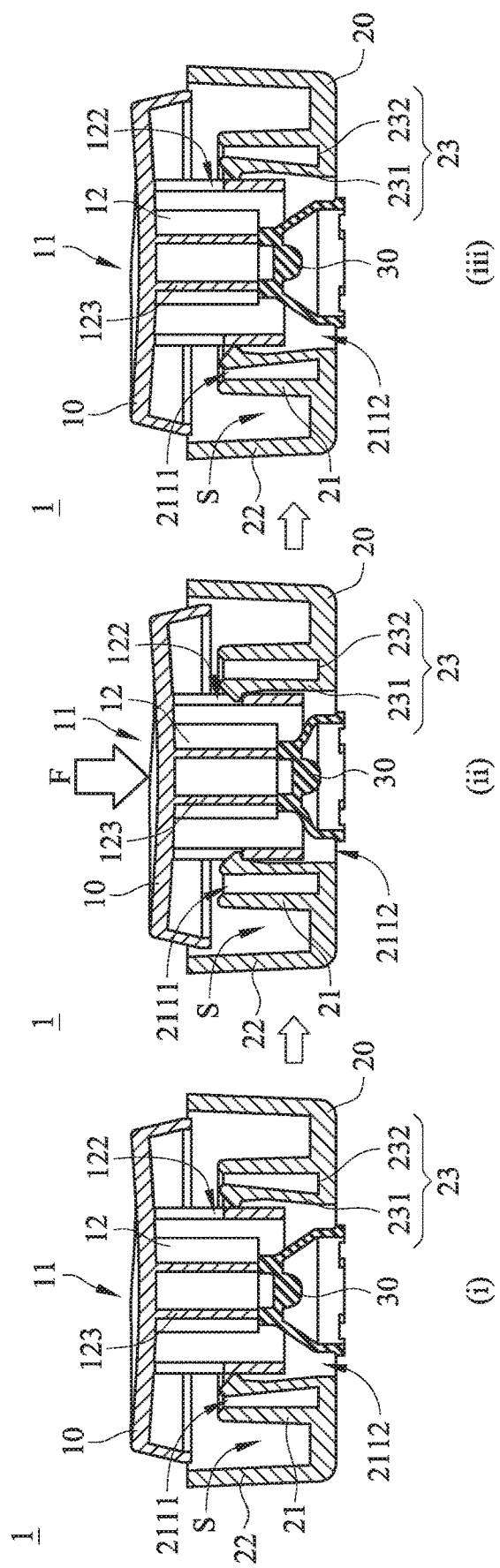
FIG. 4B schematically illustrates the actions of the key structure as shown in FIG. 3 and taken along the line B-B'.

Please refer to FIGS. 3, 4A and 4B. FIG. 3 is a schematic top view illustrating the key structure according to the first embodiment of the present invention. FIG. 4A schematically illustrates the actions of the key structure as shown in FIG. 3 and taken along the line A-A'. FIG. 4B schematically illustrates the actions of the key structure as shown in FIG. 3 and taken along the line B-B'.

As shown in FIG. 4A(i), the keycap 10 is not pressed down. Meanwhile, the elastic element 30 is contacted with the coupling shaft 12, and the two coupling ribs 121 are respectively contacted with the two stopping parts 24. Since the two coupling ribs 121 are respectively stopped by the two stopping parts 24, the position of the keycap 10 is limited. Consequently, the keycap 10 is not detached from the key slot 211. As mentioned above, there is a height difference between the coupling rib 121 and the corresponding opening 122 along the vertical direction. Consequently, as shown in FIG. 4B(i), the elastic hooks 231 of the buffering elements 23 are contacted with the surface of the coupling shaft 12 at the underlying positions of the corresponding openings 122. Under this circumstance, the elastic hooks 231 interfere with the coupling shaft 12.

As shown in FIG. 4A(ii), an external force F is applied to the main body 11 of the keycap 10. In response to the external force F, the coupling ribs 121 are moved in the direction away from the corresponding stopping parts 24. Consequently, as shown in FIG. 4B(ii), the elastic hooks 231 of the buffering elements 23 are elastically swung and inserted into the corresponding openings 122. Under this circumstance, the elastic hooks 231 do not interfere with the coupling shaft 12. Moreover, as the push part 123 of the coupling shaft 12 is moved downwardly to push the elastic element 30, the elastic element 30 is subjected to elastic deformation and a switch on a circuit board (not shown) is triggered by the elastic element 30. Consequently, the circuit board generates a corresponding key signal.

As shown in FIG. 4B(iii), the elastic element 30 is elastically restored to its original shape. In response to the elastic restoring force of the elastic element 30, the coupling shaft 12 is moved upwardly and the keycap 10 is returned to its original position. While the keycap 10 is moved upwardly and the elastic hooks 231 of the buffering elements 23 are moved to the junctions between the openings 122 and the surface of the coupling shaft 12, the elastic hooks 231 are pushed by the surface of the coupling shaft 12. Consequently, the elastic hooks 231 are swung and detached from the corresponding openings 122. Then, the elastic hooks 231 are contacted with the surface of the coupling shaft 12 again. Consequently, the elastic hooks 231 interfere with the coupling shaft 12. Due to the interference between the buffering elements 23 and the coupling shaft 12, the ascending speed of the keycap 10 is reduced. Consequently, while the keycap 10 is restored to its original position, the click sound generated by the collision between the two coupling ribs 121 and the corresponding stopping parts 24 (see FIGS. 4A(iii)) can be effectively reduced. That is, the noise reducing function is achieved. Moreover, the coupling rib 121 has the slant surface 1211. Consequently, while the keycap 10 is moved upwardly, the stopping parts 24 are contacted with the corresponding slant surfaces 1211. Since the direct surface collision between the stopping parts 24 and the corresponding coupling ribs 121 is avoided, the noise reducing efficacy is further enhanced.

Figure 5A:
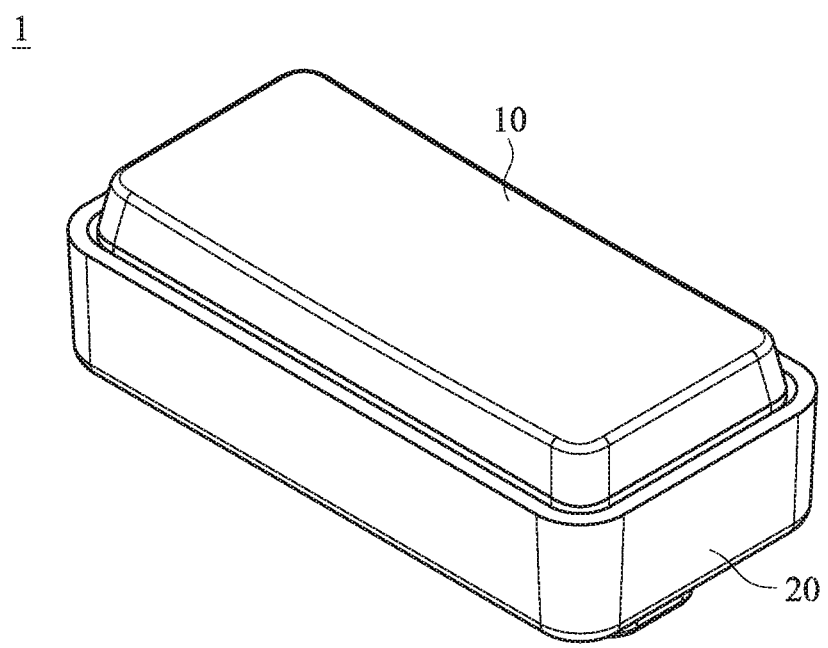
FIG. 5A is a schematic perspective view illustrating a key structure according to a second embodiment of the present invention.
Figure 5B:
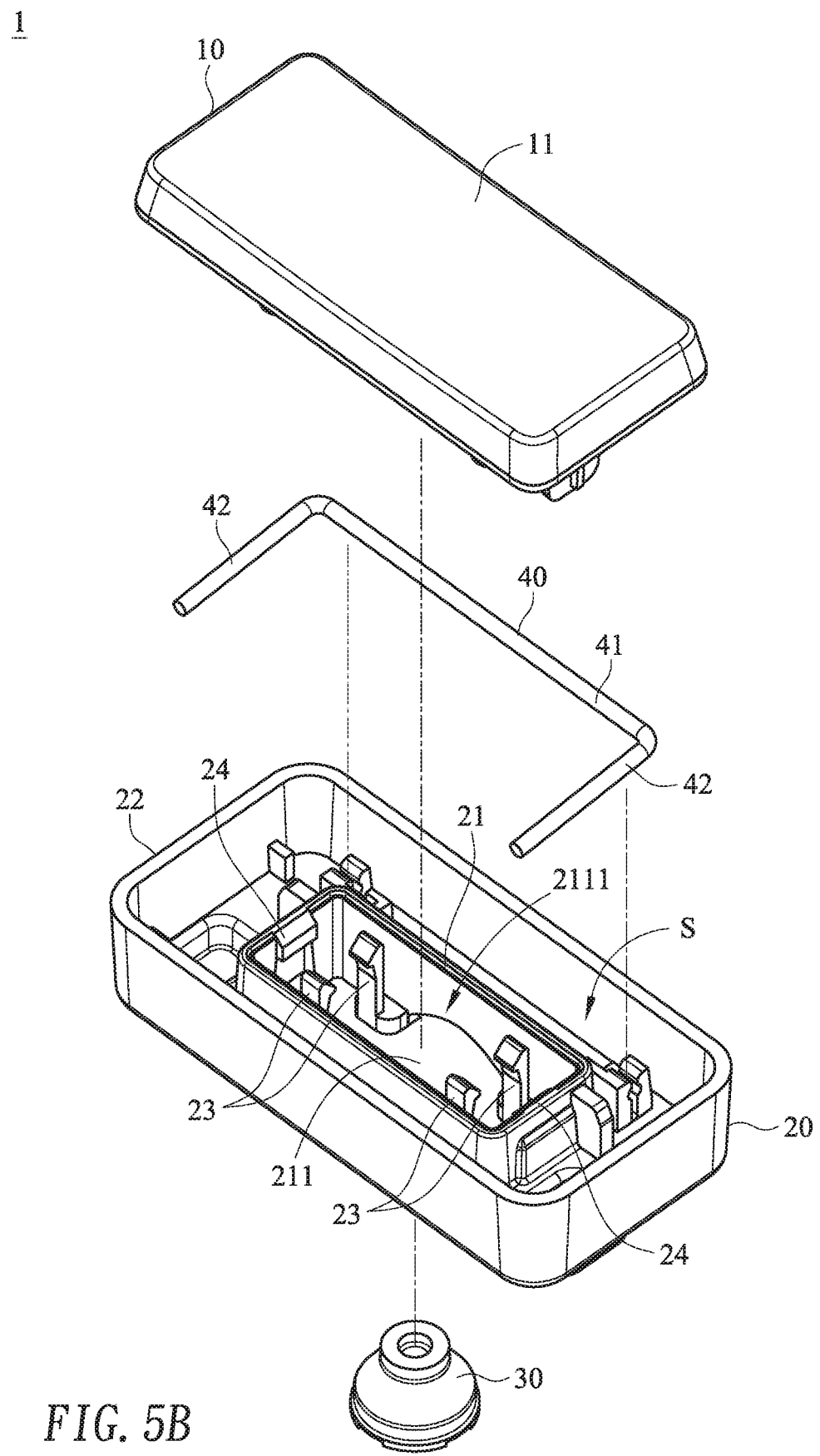
FIG. 5B is a schematic exploded view illustrating the key structure according to the second embodiment of the present invention and taken along a viewpoint.
Figure 5C:
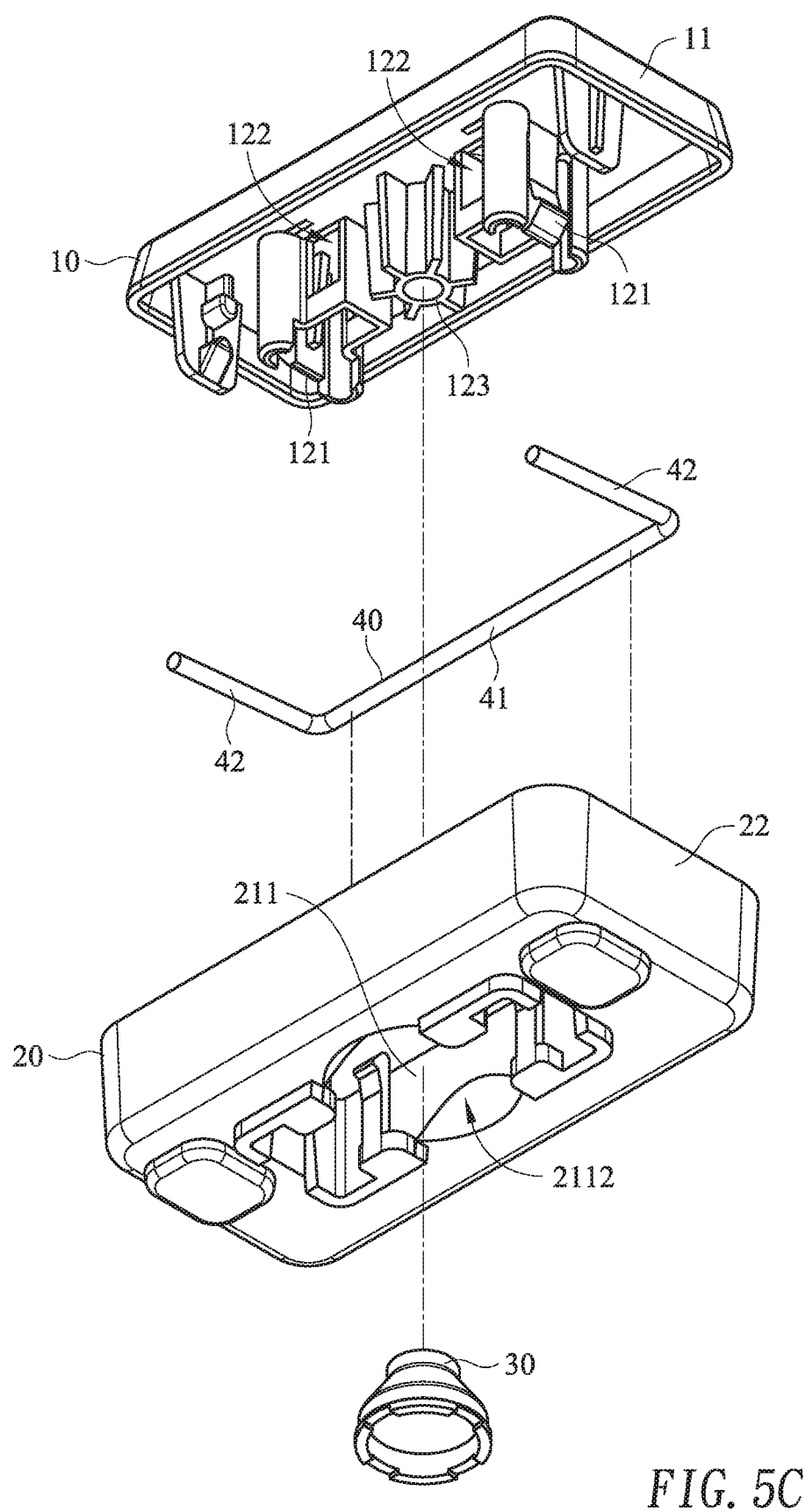
FIG. 5C is a schematic exploded view illustrating the key structure according to the second embodiment of the present invention and taken along another viewpoint.

Please refer to FIGS. 5A, 5B and 5C. FIG. 5A is a schematic perspective view illustrating a key structure according to a second embodiment of the present invention. FIG. 5B is a schematic exploded view illustrating the key structure according to the second embodiment of the present invention and taken along a viewpoint. FIG. 5C is a schematic exploded view illustrating the key structure according to the second embodiment of the present invention and taken along another viewpoint. Component parts and elements corresponding to those of the first embodiment are designated by identical numeral references, and detailed descriptions thereof are omitted.

In comparison with the key structure of FIGS. 1A and 1B, the key structure 1 as shown in FIGS. 5A and 5B is an elongated key structure with an elongated key slot 211. The pedestal 20 comprises an inner ring-shaped wall structure 21, an outer ring-shaped wall structure 22, four buffering elements 23 and two stopping parts 24. The two stopping parts 24 are located at two opposite short sides of the key slot 211. Two of the four buffering elements 23 are installed on the inner surface at a long side of the key slot 211. The other two of the four buffering elements 23 are installed on the inner surface at the other long side of the key slot 211. Moreover, the elongated key structure 1 further comprises a linking bar 40. Due to the linking bar 40, the elongated key structure 1 is not aslant moved when the elongated key structure 1 is pressed down. Consequently, the elongated key structure 1 can be stably ascended and descended. In this embodiment, the linking bar 40 has an inverted U-shaped structure. That is, the linking bar 40 comprises a long transverse segment 41 and two branch segments 42. The two branch segments 42 are perpendicular to the transverse segment 41. The transverse segment 41 is pivotally coupled to a lower portion of the accommodation space S. The branch segments 42 are connected with the bottom surface of the main body 11 of the keycap 10 in order to support the main body 11 of the keycap 10. While the main body 11 of the keycap 10 is ascended and descended, the transverse segment 41 is rotated with the transverse segment 41. Consequently, the main body 11 of the keycap 10 can be ascended and descended more stably.

From the above descriptions, the present invention provides the key structure. When compared with the conventional technologies, the key structure of the present invention has less number of components and simplified construction. The buffering elements installed in the key slot can reduce the ascending speed of the keycap. Since the click sound caused from collision while the keycap is restored to its original position is effectively reduced, the technology of the present invention has the noise reducing function. In other words, the key structure of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. A key structure, comprising:
   a keycap comprising a main body and a coupling shaft, wherein the coupling shaft is disposed on a bottom surface of the main body, and the coupling shaft comprises at least two opposite coupling ribs and two opposite openings;

a pedestal comprising a key slot, at least two stopping parts and at least two buffering elements, wherein the key slot has an upper part and a lower part, the coupling shaft is penetrated through the upper part of the key slot and movable within the key slot upwardly or downwardly, the at least two stopping parts are located at the upper part of the key slot and aligned with the at least two coupling ribs, and the at least two buffering elements are located at an inner surface of the key slot, contacted with a surface of the coupling shaft and aligned with the at least two openings; and an elastic element installed in the lower part of the key slot, wherein the elastic element is contacted with the coupling shaft, so that the at least two coupling ribs are contacted with the at least two stopping parts, wherein when an external force is applied to the main body of the keycap, the at least two buffering elements are inserted into the at least two openings, wherein when the external force is released, the elastic element is elastically restored, so that the keycap is ascended and returned to an original position, wherein while the keycap is ascended and returned to the original position, the at least two buffering elements are detached from the at least two openings and the at least two buffering elements interfere with the coupling shaft, so that an ascending speed of the keycap is reduced and a click sound generated from collision between the at least two coupling ribs and the at least two stopping parts is reduced.

2. The key structure according to claim 1, wherein the at least one two stopping parts are located at two opposite corners of the upper part of the key slot.

3. The key structure according to claim 1, wherein the at least one two stopping parts are located at two opposite sides of the upper part of the key slot.

4. The key structure according to claim 1, wherein the at least two buffering elements are located at two opposite corners of the inner surface of the key slot.

5. The key structure according to claim 1, wherein the at least two buffering elements are located at two opposite sides of the inner surface of the key slot.

6. The key structure according to claim 1, wherein each of the at least two buffering element comprises a connecting part and an elastic hook, wherein a first end of the connecting part is connected with the inner surface of the key slot, a second end of the connecting part is connected with the elastic hook, and a swingable gap is formed between the elastic hook and the inner surface of the key slot.

7. The key structure according to claim 6, wherein a first end of the coupling shaft is connected with the main body of the keycap, and a second end of the coupling shaft is away from the main body of the keycap, wherein the at least two coupling ribs are located at the second end of the coupling shaft, and the at least two openings are located at the first end of the coupling shaft.

8. The key structure according to claim 7, wherein while the keycap is descended, the elastic hook is swung and inserted into the corresponding opening, so that the elastic hook does not interfere with the coupling shaft.

9. The key structure according to claim 7, wherein while the keycap is ascended, the elastic hook is pushed by the surface of the coupling shaft, so that the elastic hook is swung and detached from the corresponding opening and the elastic hook and the coupling shaft interfere with each other.

10. The key structure according to claim 6, wherein the elastic hook has a slant surface.

11. The key structure according to claim 1, wherein the coupling shaft comprises a push part for pushing the elastic element, wherein the push part is located at a middle region of a bottom side of the coupling shaft.

12. The key structure according to claim 1, wherein the pedestal further comprises an inner ring-shaped wall structure and an outer ring-shaped wall structure, wherein the inner ring-shaped wall structure is arranged around the key slot, the outer ring-shaped wall structure is arranged around the inner ring-shaped wall structure, and the outer ring-shaped wall structure and the inner ring-shaped wall structure are connected with each other at the lower part of the key slot.

13. The key structure according to claim 12, wherein an accommodation space is formed between the inner ring-shaped wall structure and the outer ring-shaped wall structure, and a skirt structure of the main body of the keycap is accommodated within the accommodation space.

14. The key structure according to claim 13, wherein the key structure further comprises a linking bar, and the linking bar is pivotally coupled to a lower portion of the accommodation space to support the main body of the keycap.

* * * * *